H. HEYMANN.
MOTOR CONTROL.
APPLICATION FILED FEB. 26, 1910.

962,835.

Patented June 28, 1910.

WITNESSES
J. Earl Ryan
J. Ellis Glen

INVENTOR
HUGO HEYMANN
BY
Albert G. Davis
HIS ATTORNEY

UNITED STATES PATENT OFFICE.

HUGO HEYMANN, OF BERLIN, GERMANY, ASSIGNOR TO GENERAL ELECTRIC COMPANY, A CORPORATION OF NEW YORK.

MOTOR CONTROL.

962,835.  Specification of Letters Patent.  Patented June 28, 1910.

Application filed February 26, 1910. Serial No. 546,057.

*To all whom it may concern:*

Be it known that I, HUGO HEYMANN, a subject of the Emperor of Germany, residing at Berlin, Germany, have invented certain new and useful Improvements in Motor Control, of which the following is a specification.

This invention relates to motor control systems and has for its object the provision of means whereby an electric motor may be controlled within a wide range in a simple and efficient manner.

My invention relates more specifically to the control of motors operated on what is known as the "Leonard" system, wherein the motor is supplied with current from a separately excited generator and the speed of the motor is varied by varying the field strength of the generator.

One of the objects of my invention is to provide a greater range of speed regulation than is generally given under ordinary operating conditions. It is often desirable to have in addition to the speed regulation from zero to normal running speed of the motor an increase in the speed above its normal running speed. It is also desirable that the field of the motor be kept at full strength until it reaches its normal running speed.

In carrying out my invention I provide, in addition to the regulation of the motor provided through the regulator of the generator field, a rheostat for controlling the field of the motor. This rheostat is normally locked in full field position and is provided with means whereby the lever is unlocked so as to permit the field to be weakened when the motor reaches a predetermined speed.

Figure 1:
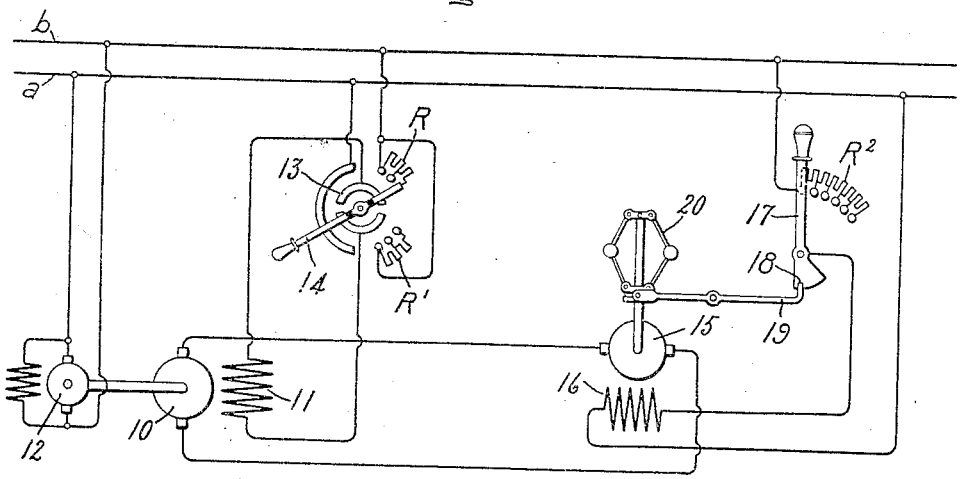
Figure 2:
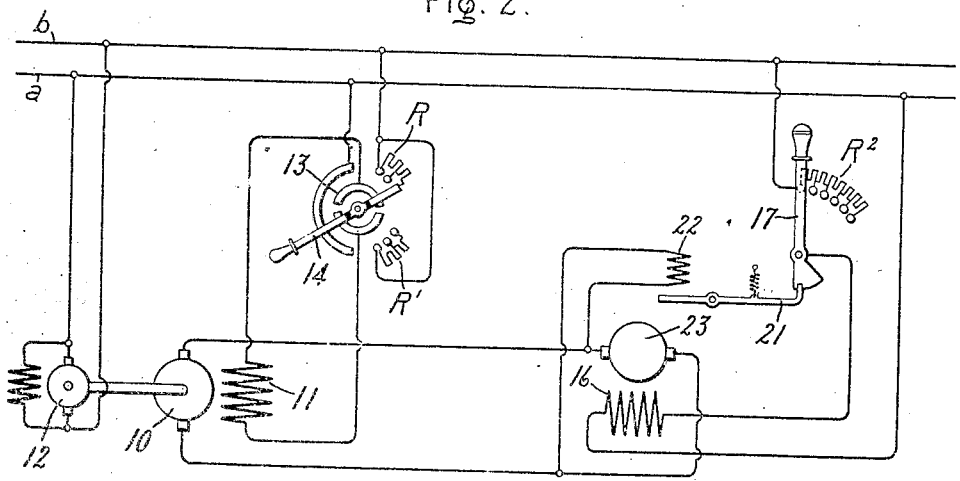

In the accompanying drawing, in which I have shown my invention embodied in concrete structure for purposes of illustration, Figure 1 represents a diagrammatic view embodying one form of my invention, and Fig. 2 a diagrammatic view of another form of my invention.

Referring first to Fig. 1, 10 represents the armature of a generator having a separately excited field 11. 12 represents the exciter, which may be on the same shaft as the generator, as shown. A reversing rheostat 13 is provided by varying the field strength of the generator and for reversing the same. This field is energized from the conductors $a$ $b$, fed by the exciter 12. When the arm 14 of the regulator is in the position shown, the resistance R is in series with the field of the generator and this resistance may be varied in the well-known manner. When the lever 14 is moved onto the studs of the resistance R', the current through the field will be reversed. 15 represents the armature of the working motor and 16 the field of this motor. This field is energized from the exciter 12 and a rheostat or regulator is arranged in series with this field. This regulator consists of a regulating resistance $R^2$ provided with a series of studs over which the pivoted arm 17 passes. On the hub of this arm is a segmental portion provided with a notch 18 adapted to be engaged by the pivoted lever 19. The notch is so arranged that when the arm is in the position in which the resistance is cut out of the field circuit, it will be engaged by the lever 19 and held in this position. The opposite end of the lever 19 is operated by a centrifugal governor 20 so arranged that when the motor reaches a predetermined speed, it will shift the lever 19 out of the slot 18 and release the arm 17.

In operation, when the motor has reached the highest speed which can be obtained with the regulation of the field 11 of the generator, or when the motor reaches a predetermined speed, the lever 17 is released and may be turned to insert resistance $R^2$ in the field of the motor and thereby increase its speed.

In the form shown in Fig. 2, I have shown substantially the same arrangement, with the exception that the lever 17 is locked by a spring pressed lever 21, which normally locks the arm 17 in the full field position. In this case the lever 21 is controlled by an electromagnet 22 arranged to attract the lever 21 and release the armature 17, when the motor reaches a predetermined speed. I have shown this electromagnet connected across the terminals of the motor 23, so that when the counter-electromotive force of the motor reaches a predetermined amount the lever will be released. Otherwise the sequence of operation is the same as in the form shown in Fig. 1.

It will be seen that I have provided a very simple and efficient means for increasing the range of speed of electric motors, and while I have described my invention as embodied in concrete mechanism and as operating in a specific manner for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is—

1. The combination with a separately excited generator supplying current to a motor, of means for varying the field strength of the generator, a field regulator for the motor and means for preventing the operation of said regulator until the motor reaches a predetermined speed.

2. The combination with a separately excited generator supplying current to a motor, of means for varying the field strength of the generator, a field regulator for the motor, and means for preventing the weakening of the motor field until the motor reaches a predetermined speed.

3. The combination with a separately excited generator supplying current to a motor, of means for varying the field strength of the generator, an auxiliary speed regulator for the motor and means for preventing the operation of said regulator until the motor reaches a predetermined speed.

4. The combination with a separately excited generator supplying current to a motor, of means for varying the field strength of the generator, an auxiliary speed regulator for the motor and electromagnetically controlled means for preventing the operation of said regulator until the motor reaches a predetermined speed.

5. The combination with a separately excited generator supplying current to a motor, of means for varying the field strength of the generator, an auxiliary speed regulator for the motor normally locked in full field position, and means for releasing said regulator when the motor reaches a predetermined speed.

6. The combination with a separately excited generator supplying current to a motor, of means for varying the field strength of the generator, an auxiliary speed regulator for the motor normally locked in full field position, and electrically controlled means for releasing said regulator when the motor reaches a predetermined speed.

In witness whereof, I have hereunto set my hand this ninth day of February, 1909.

HUGO HEYMANN.

Witnesses:
JULIUS RUMLAND,
KARL MICKELSEN.